(No Model.) 2 Sheets—Sheet 2.
P. DIEHL.
CLUTCH LUBRICATING DEVICE.
No. 511,412. Patented Dec. 26, 1893.
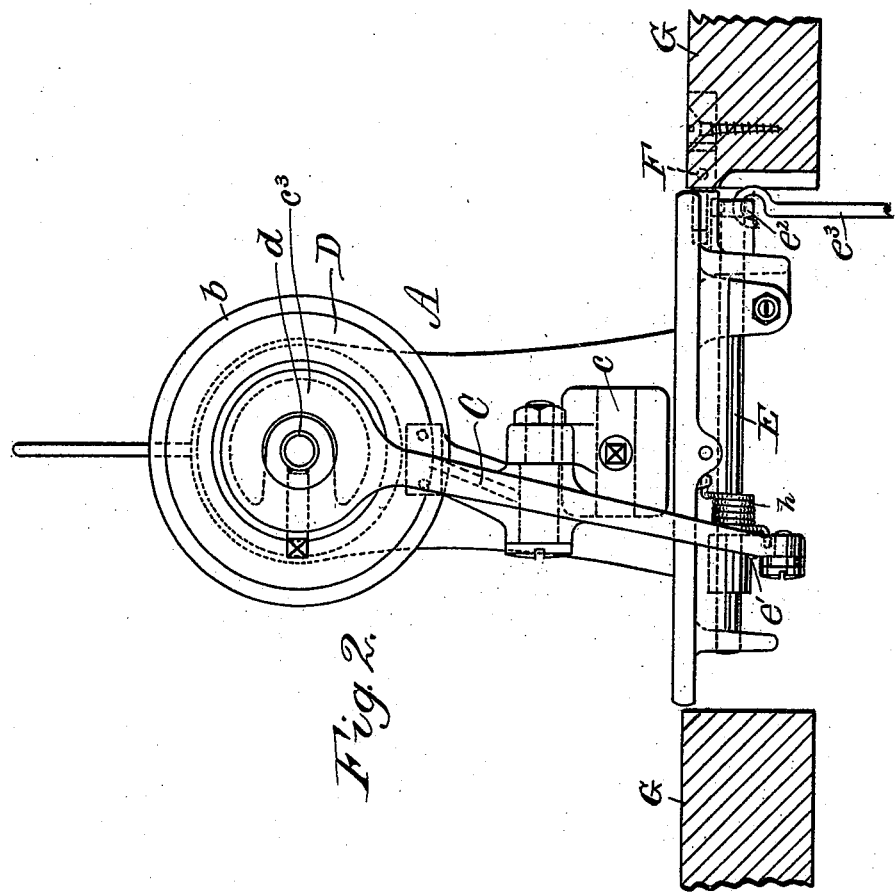
WITNESSES:
INVENTOR:
Philip Diehl,
BY
ATTORNEY.

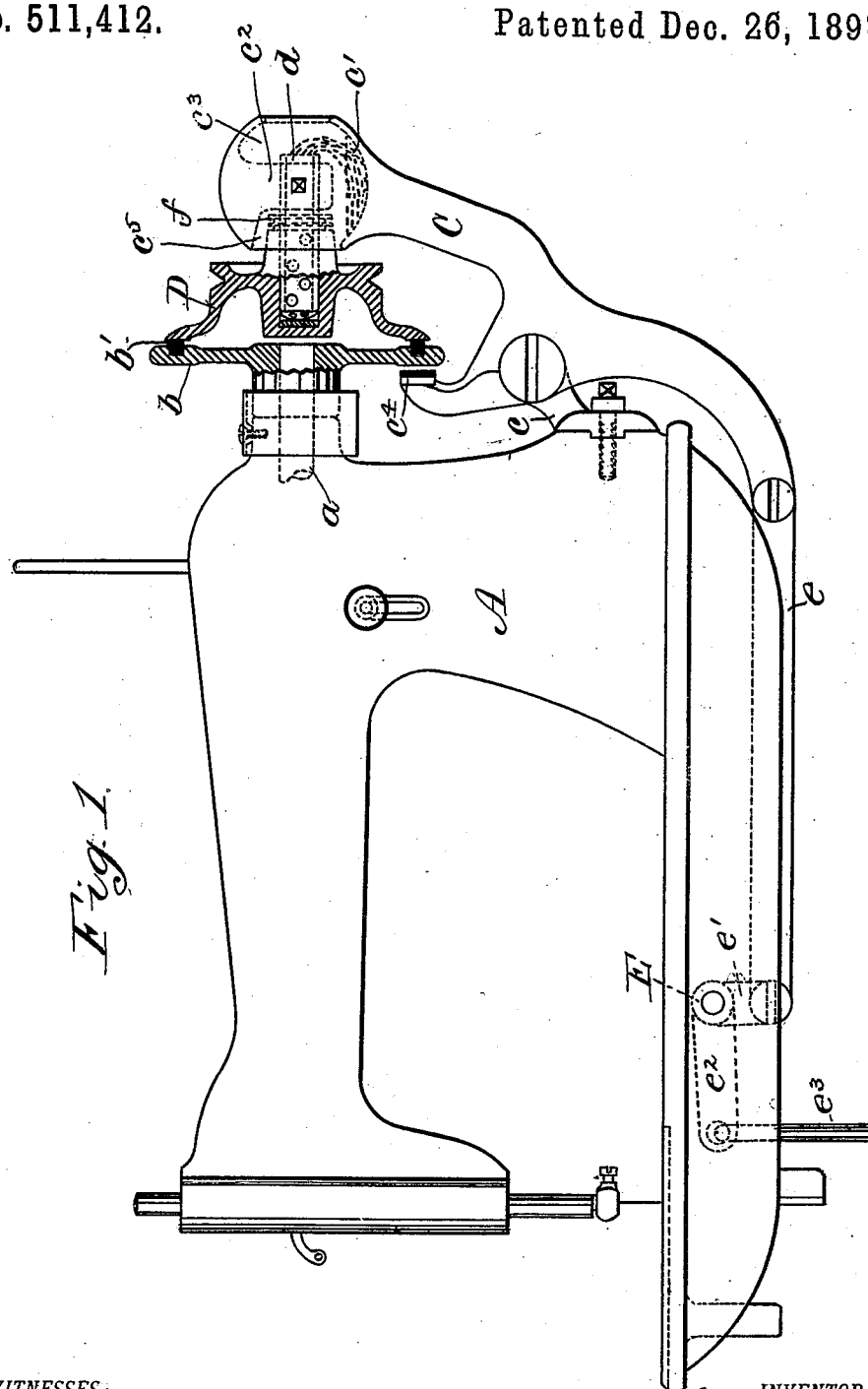

UNITED STATES PATENT OFFICE.

PHILIP DIEHL, OF ELIZABETH, NEW JERSEY, ASSIGNOR TO THE SINGER MANUFACTURING COMPANY OF NEW JERSEY.

CLUTCH-LUBRICATING DEVICE.

SPECIFICATION forming part of Letters Patent No. 511,412, dated December 26, 1893.

Application filed July 12, 1893. Serial No. 480,228. (No model.)

*To all whom it may concern:*

Be it known that I, PHILIP DIEHL, a citizen of the United States, residing at Elizabeth, in the county of Union and State of New Jersey, have invented certain new and useful Improvements in Driving Attachments for Sewing-Machines, of which the following is a specification, reference being had therein to the accompanying drawings.

In the use of friction clutch driving attachments for sewing machines great difficulty has been experienced by reason of the fact that the oil by which the driving pulleys are lubricated has a tendency to escape by centrifugal force from the parts to be lubricated and to be thrown about so as to soil the work, the work table, or the floor of the room; and my invention has for its object to obviate this difficulty.

In carrying my invention into effect the clutch pulley by which the power is transmitted to the sewing machine is mounted on a chambered stud into which extends a wick or conductor running to an oil cup, and through which wick or conductor the oil is led by capillary attraction to the interior or chamber of said stud, passing thence to the bearing of the clutch pulley; and to prevent the escape of surplus oil the hub of the clutch pulley is closed at one end and its opposite or open end, running on said chambered stud, is extended so as to be within a housing, which forms a guarded chamber over the oil cup; and thus any surplus oil, which can only escape from the open end of the hub of the pulley, is returned by centrifugal action or gravity to the said oil cup.

To adapt my invention for use in what is known as an "upper driver" for sewing machines, or a driver by which the power is transmitted directly from the driven pulley to the pulley or wheel mounted directly on the shaft of the sewing machine, I preferably form the oil cup and oil guard chamber at the upper portion of a lever which serves as a support for the chambered stud on which the clutch pulley is to run, which lever is also preferably provided with a brake to engage the driven pulley when the lever is operated to release the driving pulley therefrom. The said lever is preferably mounted on the arm or frame of the machine and thus moves therewith when the machine is turned up on its hinges for access to the parts below the bed plate, and by thus mounting the said lever or pulley support on the machine frame the driving pulley is always concentric with the driven pulley so that the axes of the said pulleys are always in alignment. To permit the machine to be turned up without disconnecting the treadle connections with said lever the treadle rod, joining said connections, is placed at the rear side of the under part of the work plate, closely adjacent to the hinges of the latter. To prevent the oil in the oil cup from being spilled when the machine is turned up said oil cup has an extension into which the oil can run when the arm of the machine is inclined over backward.

In the accompanying drawings Figure 1 is a side elevation of a sewing machine with my invention applied thereto, the driving and driven pulleys being shown in section. Fig. 2 is an end elevation of the same, a portion of the table or bench on which the sewing machine is mounted being shown in section.

A denotes a sewing machine, which may be of any usual construction; and $a$ is the driving shaft carrying the fast fly wheel or pulley $b$ to which power is to be applied. Secured to some part of the frame of the machine (as to the vertical portion of the arm of the machine) is a small bracket $c$ to which is pivotally attached a lever C provided at its upper end with an oil cup $c'$ and with a support $c^2$ to which latter is attached a chambered or hollow stud $d$ on which is mounted the driving pulley D. Above the oil cup $c'$ is provided an oil guard chamber $c^5$ formed by a suitable housing. The chambered stud $d$ instead of being made in the form of a perforated sleeve may be simply a solid stud having a groove to receive the oil conducting wick. The outer face of the pulley $b$ is preferably provided with a recess in which is placed a friction ring $b'$ of leather or other suitable material against which the driving pulley D is to be forced when the machine is to be set in motion.

Attached to the lower end of the lever C is a link $e$ connected to an arm $e'$ of a transverse rock shaft E arranged beneath the forward end of the work plate of the sewing machine, said arm having at the rear side of the sewing machine, and near the hinge thereof, a second arm $e^2$ to which is attached a rod $e^3$ which is to run to a suitable treadle by which the lever C can be operated to force the driving pulley D into contact with the pulley $b$ when the machine is to be set in motion. A suitable spring, as the torsional spring $h$ on the rock-shaft E, will operate the lever C to release the driving pulley D from the driven pulley $b$ when pressure upon the treadle is relieved, the said lever being preferably provided with the brake $c^4$ which, when the pressure on the treadle is relieved, will come into contact with the driven wheel $b$ to arrest the motion thereof. By connecting the treadle rod to the shaft E at the rear side of the work plate of the machine, and near the hinges F by which said work plate is attached to the table or bench G, the machine is adapted to be turned up on its hinges when access to the under side thereof is desired, without disconnecting the treadle rod $e^3$. The driving pulley D, running upon the chambered stud $d$, has its hub closed at its outer end, as clearly shown in Fig. 1, while the opposite or open end of said hub is extended into the guard chamber $c^5$ and over the cup $c'$, and thus surplus oil will be prevented from escaping from the outer end of the hub of said wheel; and as it can only escape from the inner end of said hub it will be thrown off by centrifugal action and returned by gravity to the oil cup, the oil thrown against the walls of the oil guard chamber running down said walls into the oil cup. To prevent oil from creeping outward on the outer surface of the hub of the wheel D I preferably provide the inner end of said hub (which is in the oil guard chamber and over the oil cup) with one or more annular grooves $f$. The oil cup $c'$ is preferably provided with an extension $c^8$ made in the form of a segmental chamber within the upper end of the lever C, so that when the machine, to which the said lever is attached, is turned up on its hinges, for access to the parts beneath the work plate, the oil from the oil-cup will run into said extension; and thus any danger of spilling the oil, when the machine is thus turned up, will be avoided.

While I have herein shown my invention as applied to a friction clutch connection of the driving and driven pulleys it will be understood that the same may be used with any other well-known form of clutch by which driving and driven pulleys may be caused to be operatively engaged, or with fast and loose pulleys and a belt shifter.

Having thus described my invention, I claim and desire to secure by Letters Patent—

1. In a sewing machine driving attachment, the combination with a pulley and a chambered stud on which the same is mounted, to rotate freely thereon, of an oil guard chamber and an oil cup from which latter, by a wick or other suitable conductor, oil may be conveyed by capillary attraction to the pulley bearing afforded by said stud, said pulley having a hub which is closed at one end and the opposite end of which is extended into said oil guard chamber and over said oil cup.

2. In a sewing machine driving attachment, the combination with an oil cup and an oil guard chamber or housing, of a driving pulley having a hub extending within said chamber or housing and over said oil cup, a pulley to be driven, and a lever by which said driving and driven pulleys may be caused to be operatively engaged with each other.

3. In a sewing machine driving attachment, the combination with a support or bracket on the frame of the machine, of a lever pivotally secured to said support or bracket and provided at its upper end with an oil guard chamber and an oil cup, a chambered stud secured to said lever, and a pulley loosely mounted so as to run freely upon said stud and having a hub which is closed at one end and the opposite end of which extends into said oil guard chamber and over the said oil cup.

4. In a sewing machine driving attachment, the combination with a sewing machine and with driving and driven pulleys, of a lever supported by the frame-work of said machine and by which the said driven and driving pulleys are to be forced into operative contact with each other, connections, extending beneath the work-plate of the machine, by which the said lever is to be operated, and a treadle rod attached to said connections near the rear side of the work-plate of the machine, and near the hinges by which the said work-plate is mounted on the supporting table or bench.

5. The combination with a sewing machine, of a lever supported by the frame-work thereof, and provided at its upper end with an oil guard chamber and an oil cup, said oil cup being so shaped as to receive the oil and prevent the same from spilling when the machine is turned up on its hinges, a chambered stud supported by said lever, and a driving pulley mounted on said stud and having a hub which is closed at one end and the other end of which extends within the said oil guard chamber and over said oil cup.

6. The combination with a sewing machine, of the lever C supported by the frame of the machine and carrying at its upper end a driving pulley by which power may be transmitted to the shaft of the sewing machine, the rock shaft E having two arms one of which is connected to the lower end of said lever, and to the other of which the treadle rod is connected, the last named arm being located near the rear side of the machine and adjacent to the hinges by which the latter is connected with the bench or work table.

7. The combination with a sewing machine, of the lever C supported by the frame thereof and provided at its upper end with an oil guard chamber, an oil cup and a chambered stud, the driving pulley D mounted on said stud and having the outer end of its hub closed and the inner end of said hub extended within said oil guard chamber and over said oil cup, the rock shaft E provided with the arms $e'$ and $e^2$, the latter arranged near the rear side of the work-plate of the machine, the link $e$ connecting the lower end of the said lever with the said arm $e'$, and the treadle rod $e^3$ connected to the said arm $e^2$.

In testimony whereof I affix my signature in presence of two witnesses.

PHILIP DIEHL.

Witnesses:
JAMES G. GREENE,
W. J. LONGLEY.